Figure 1:
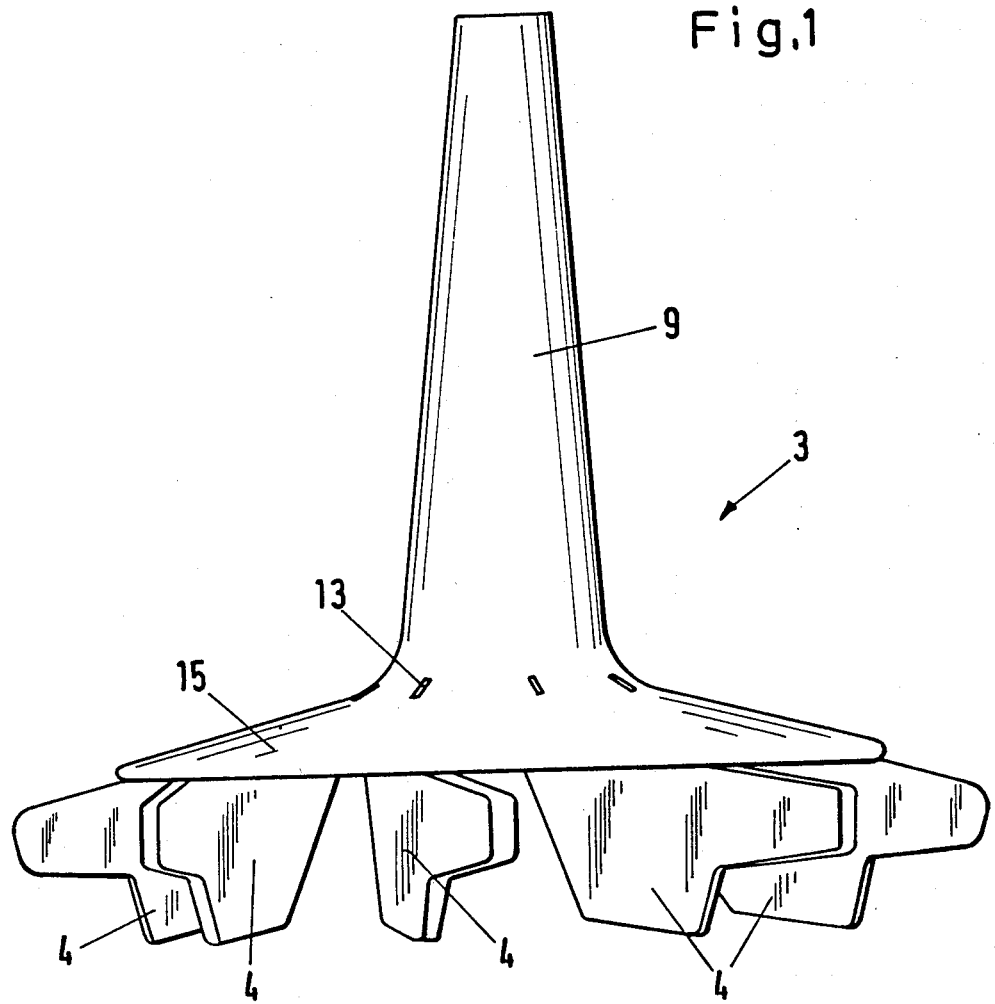

United States Patent [19]

Hankammer

[11] Patent Number: 4,885,089
[45] Date of Patent: Dec. 5, 1989

[54] LIQUID DISTRIBUTOR CAP FOR A FILTER CARTRIDGE

[75] Inventor: Heinz Hankammer, Taunusstein, Fed. Rep. of Germany

[73] Assignee: Brita Wasser-Filter-Systeme GmbH, Fed. Rep. of Germany

[21] Appl. No.: 86,998

[22] Filed: Aug. 19, 1987

[30] Foreign Application Priority Data

Aug. 19, 1986 [DE] Fed. Rep. of Germany ....... 3628029

[51] Int. Cl.$^4$ ............................................. B01D 35/04
[52] U.S. Cl. .................................. 210/420; 210/428; 210/436; 210/456; 210/472; 210/488; 210/497.3; 210/512.1; 137/803; 137/833
[58] Field of Search ................. 210/416.3, 418, 420, 210/428, 456, 512.1, 497.01, 497.3, 436, 472, 488; 137/803, 833

[56] References Cited

U.S. PATENT DOCUMENTS

| | | | |
|---|---|---|---|
| 2,302,116 | 11/1942 | Gill | 210/512.1 |
| 2,313,896 | 3/1943 | Scheble | 210/512.1 |
| 2,332,982 | 10/1943 | Blair | 210/416.3 |
| 3,517,821 | 6/1970 | Monson et al. | 210/512.1 |
| 3,546,854 | 12/1970 | Muller | 210/512.1 |
| 4,312,751 | 1/1982 | Casanitjana | 210/512.1 |
| 4,406,788 | 9/1983 | Meadus et al. | 210/512.1 |

FOREIGN PATENT DOCUMENTS 3409828  1/1988  Fed. Rep. of Germany.

Primary Examiner—Richard V. Fisher
Assistant Examiner—Wanda L. Millard
Attorney, Agent, or Firm—Biebel, French & Nauman

[57] ABSTRACT

The invention relates to a filter cartridge for a liquid filter, in particular for use for tanks for the filtration of water for the production of drinking water, with a generally cylindrical vessel, which contains the filtering material and with a sealing screen mounted on this vessel like a cover. In order to improve the functioning of a filter cartridge, and in particular to make such a filter cartridge, which with comparatively fast liquid throughput has a good filtration action with optimum utilization of the filtering material, it is proposed in conformity with the invention that the sealing screen be covered by a distributor cap 3 essentially closed at the top and open at the side.

16 Claims, 8 Drawing Sheets

(E-F)

(C-D)

(A B)

(X)

LIQUID DISTRIBUTOR CAP FOR A FILTER CARTRIDGE

The invention relates to a filter cartridge for liquid filter, in particular for use with containers for filtering water or making drinking water, with a generally cylindrical vessel which contains the filtering material, and with a sealing screen mounted as a cover on this vessel.

Such a filter cartridge is known from DE-OS No. 34 09 828. In this the bottom of the vessel is also constructed as a screen, so that the water to be purified enters via the sealing screen at the top end of the vessel, flows through the filtering material inside the vessel and flows out of the bottom screen apertures of the vessel as purified (filtered) drinking water.

With the known filter cartridges inside the vessels further partially closed cylindrical vessels are mounted in such a way that the water to be filtered, which flows into the filter cartridge from the top, has to flow successively up and down the sides of several cylinders mounted inside each other, before it can flow out of a central cylinder downwards through the base screen of the vessel. In the hollow spaces between the cylinders placed inside each other the filtering material is located, the water to be purified having to flow along a relatively long distance due to the interlocking of the cylinders, before it can come out at the bottom of the vessel.

Other filter cartridges do not have such elements for conducting the water to be filtered. These filters have however the disadvantage that a powerful jet of flowing water (e.g. from a water pipe) falling onto the sealing screen from above does not flow through the filter cartridge over its full cross-section, but makes a channel for itself through the filtering material, so that the water passes very rapidly along this channel through the filter cartridge and the filtering material and the water in some circumstances even after filtering does not have the required quality for drinking water.

Furthermore, with such filter cartridges even without the effect of a powerful water jet the shape of the sealing screen itself by itself alone results in flow along certain channels through which the water is conducted, so that in these cases also there is a risk of inadequate water filtration. This is particularly the case if the filter cartridge has been in use for some time already and the filtering material in the zone of the flow channels no longer has the required absorption capacity for the substances to be filtered out. Even if the filtering material as a whole is not yet exhausted, the quality of the filtered water may already thus be unsatisfactory, although the user has not yet filtered the maximum quantity of water which can be filtered e.g. according to the manufacturers indications.

The known first-mentioned filter cartridge does it is true not have the last-mentioned disadvantages, since because of the placing of several cylinders inside each other the water to be filtered passes through practically all the filtering material optimum use of which is thus also made in this way, there are nonetheless some possible disadvantages due to the construction of these filter cartridges affecting their manufacture and also their use.

The manufacture of such a filter cartridge is on the one hand costly, since both the cover and also the base must have one or more cylindrical structures. In addition the filling of such a cartridge with filtering material is also to some extent difficult and costly. Furthermore for the user there is the disadvantage that because of the long and narrow flow path for the water to be filtered the flow rates are fairly slow. The filter cartridge thus has only a slow liquid throughput.

The object of the invention is therefore to improve the functionning of a filter cartridge with the first-mentioned characteristics and in particular to obtain a filter cartridge which has a good filtering action with comparatively fast liquid throughput and which makes optimum use of the filtering material.

This object is achieved in that the sealing screen is covered by a distributor cap which is essentially closed at the top and open at the sides.

Such a distributor cap prevents e.g. a jet of water from being directed via the sealing screen directly onto the filtering material. In this way the formation of resultant flow channels is avoided and the water is uniformly distributed over the filtering material.

Here it is advantageous for the distributor cap to have vanes on its underside which have preferably the shape of curved plates and which run in both radial and circumferential directions.

Such vanes give to the water flowing in at the sides under the distributor cap and penetrating the sealing screen from above a circumferential direction of flow, so that the water does not pass directly and vertically through the filtering material taking the shortest path, but is guided in the manner of an eddy round the surface of the sealing screen, and penetrates the latter uniformly over its entire cross-section, so that the formation of flow channels is completely excluded as a result.

In the preferred embodiment of the invention it is furthermore provided that the sealing screen is divided into sectors on its underside by essentially radial separating ribs.

By this means it is avoided that water entering through the sealing screen can collect in concentration on any particular point on the underside of the sealing screen and flow downwards from this point into the filtering material, which would in turn result in an unwanted flow channel. Since the sealing screen is divided into sectors on its underside by separating ribs, the water which enters through the sealing screen into one of these sectors must remain in this sector, so that the above mentioned effect of water collecting at one point on the underside of the sealing screen cannot occur. The combination with the above mentioned vanes on the underside of the distributor cap has the effect that the entering water is evenly distributed over all sectors. So that the desired effects can be achieved, the number of sectors should amount to at least four, and in the preferred embodiment eight sectors are provided. Due to a clearly greater material consumption for the ribs and also because of the corresponding reduction in effective screen surface area, a further significant increase in number of sectors appears to be not justified.

In the preferred embodiment of the invention, the separating ribs have the form of radially aligned plates which with the exception of a small central zone extend over the entire radius of the filter cartridge and project into the latter to a depth corresponding as a maximum to the radius of the filter cartridge. Since the filter cartridge vessel is completely filled with filtering material, partitioning ribs of this form penetrate into the filtering material, so that the filtering material is also uniformly supplied in sectors with the water to be filtered.

The combination of the distributor cap vanes running in radial and circumferal direction with the radial ribs of the sealing screen has the effect that between each pair of vanes water is passed simultaneously to at least two sectors if the number of vanes is not greater than the number of ribs. This measure also contributes to the uniform supplying of the sectors with water.

In an advantageous further version of the invention, the distributor cap on its underside has at least one pin, which can be fitted into a corresponding aperture on the top of the sealing screen. Such a pin and the corresponding aperture constitute a reliable connection between distributor cap and sealing screen.

An embodiment of the invention is in this respect preferred in which in axial extension of each of the vanes pins are constituted which can be fitted respectively into apertures in each of the partitioning ribs.

The ribs have sufficient material to be able to constitute if required apertures with an adequately solid edge and the design with pins as axial extensions of the vanes shows itself to be economic in use of material. Several pins inserted simultaneously into apertures provide for a secure connection between sealing screen and distributor cap and also prevent any twisting of these two parts in relation to each other.

In addition it is shown to be advantageous for the distributor cap like the sealing screen to be conical in shape and to have a central hollow cone pointing upwards, the length of which corresponds at least to the radius of the filter cartridge, and which can be mounted with a firm fit on one of the in general shorter central hollow cones of the locking screen.

Such a combination of distributor cap and sealing screen can replace the above mentioned cones resp. apertures, but can however also be provided to supplement the latter. The length of the hollow cone of the distributor cap enables it to be used as a handle for the cap and — depending on the strength of the connection between distributor cap and sealing screen — also as a handle for the complete cartridge.

It is also shown to be advantageous it the distributor cap and the sealing screen each have at least one venting duct, these being in connection with the distributor cap mounted on the sealing screen. When the filter tank is filled the air in the upper part of the filter cartridge resp. distributor cap can thus escape.

In the preferred embodiment of the invention it is provided that the venting ducts are mounted in the respective hollow pins of the sealing screen and of the distributor cap.

This embodiment of the venting ducts is easy to make and together with the conical design of the sealing screen and distributor cap is also very efficient.

Figure 2:
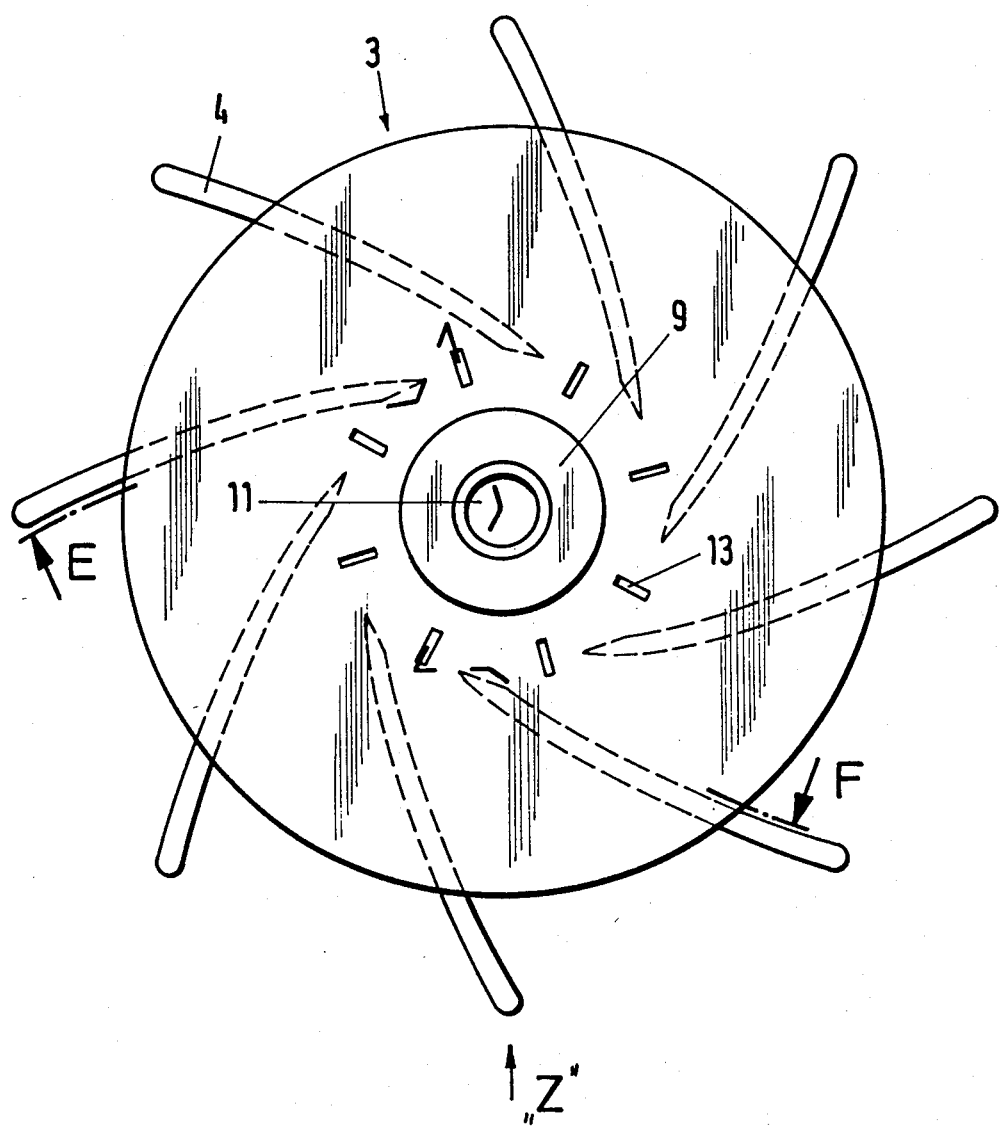
Figure 3:
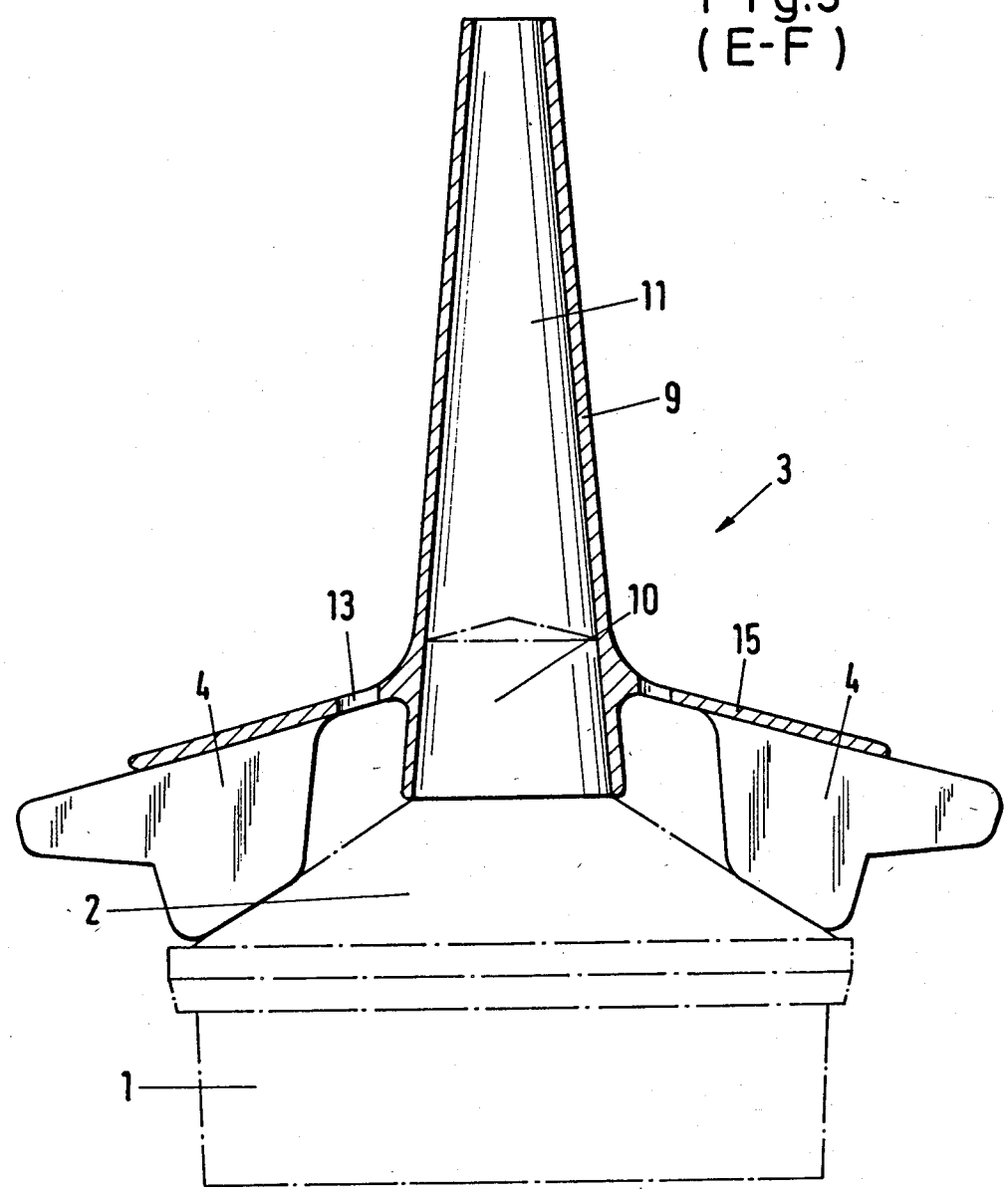
Figure 4:
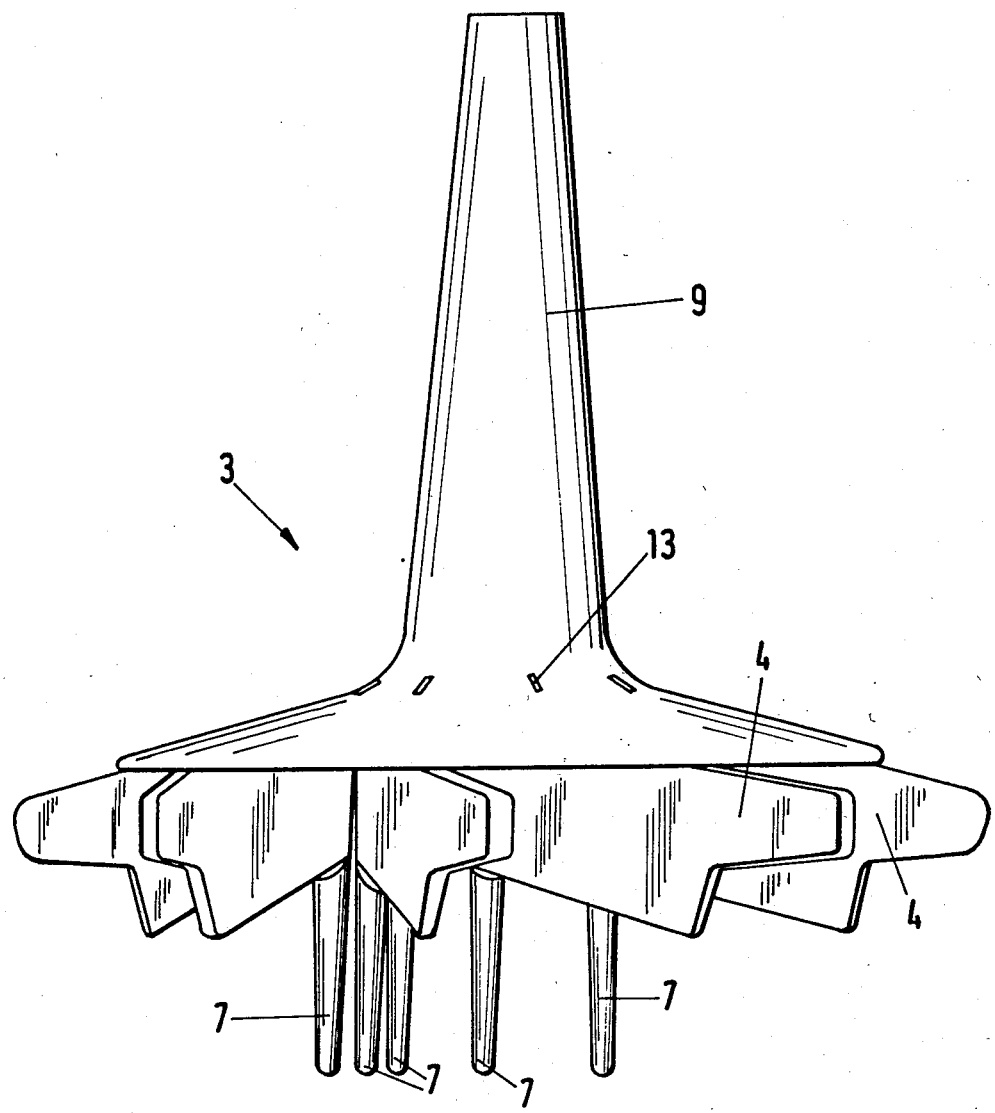
Figure 5:
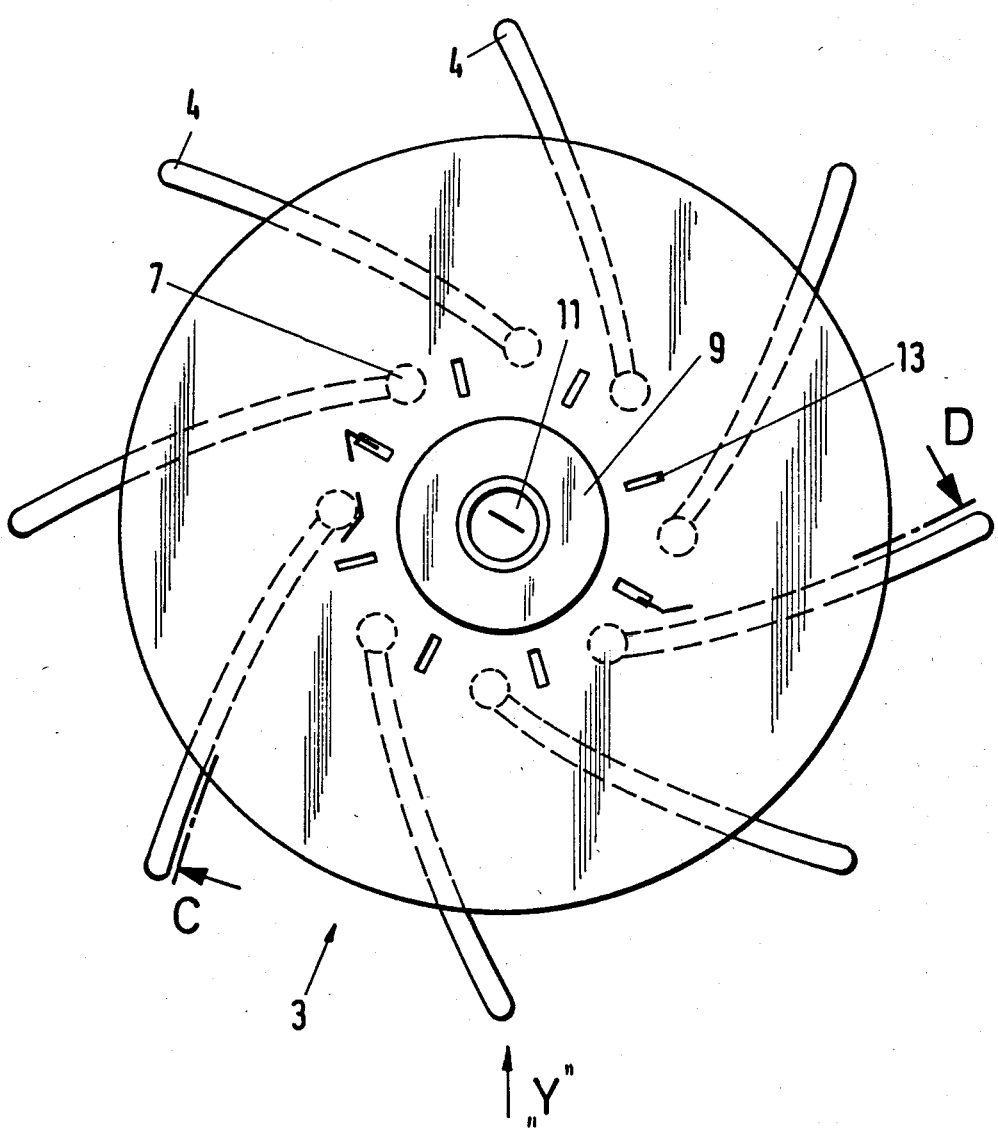
Figure 6:
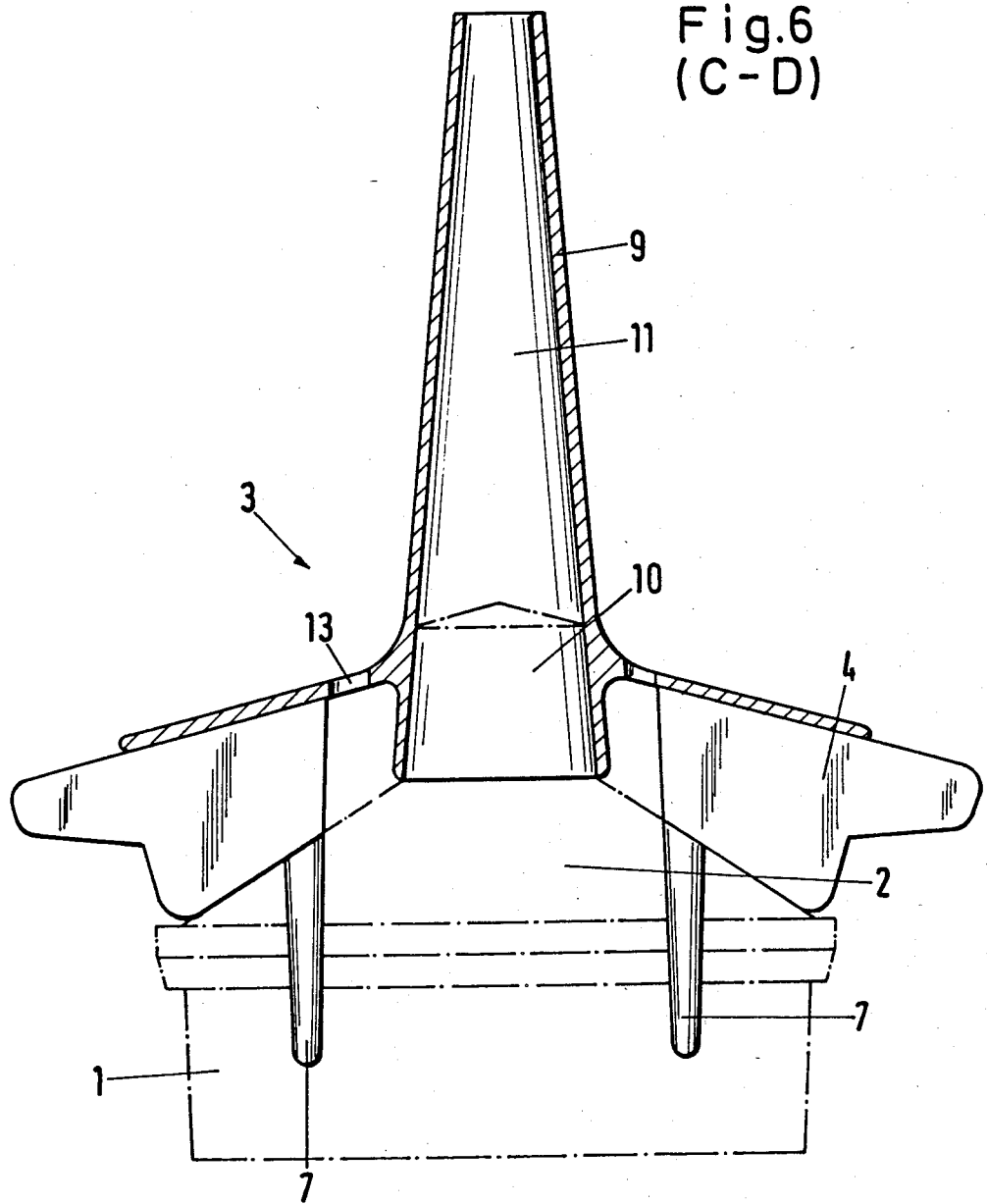
Figure 7:
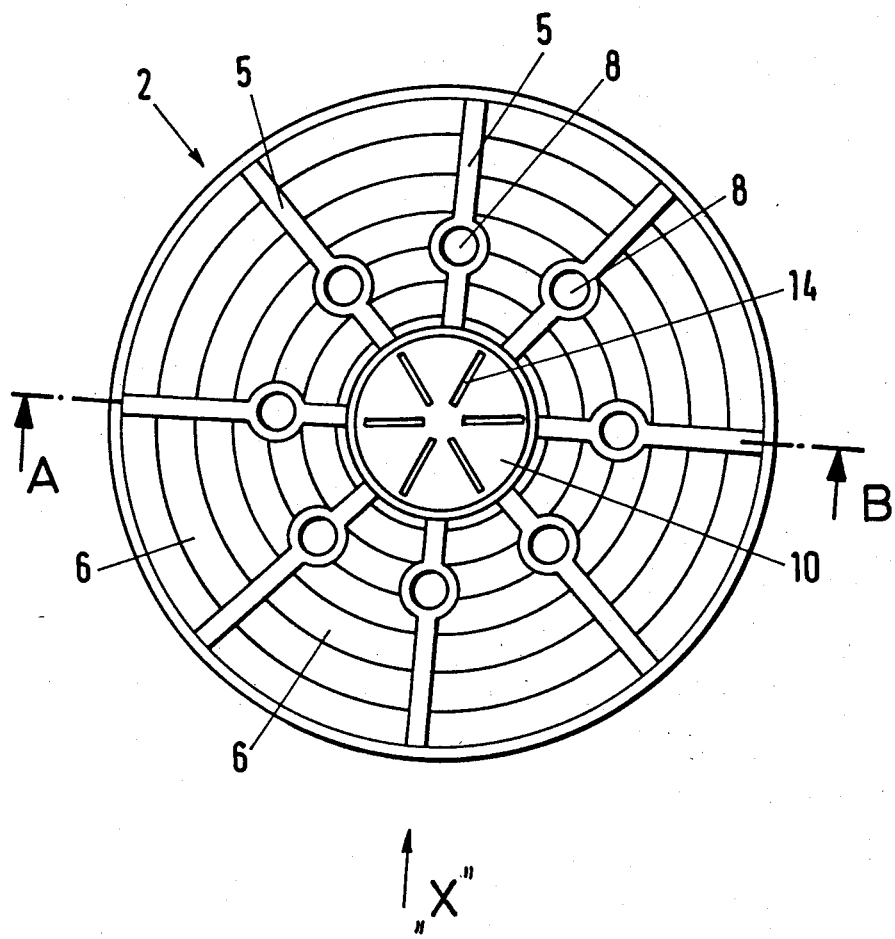
Figure 8:
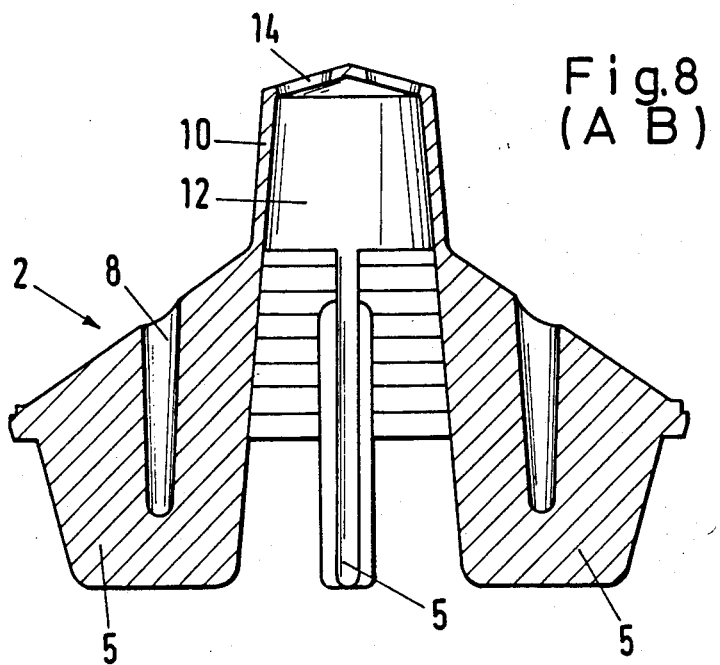
Figure 9:
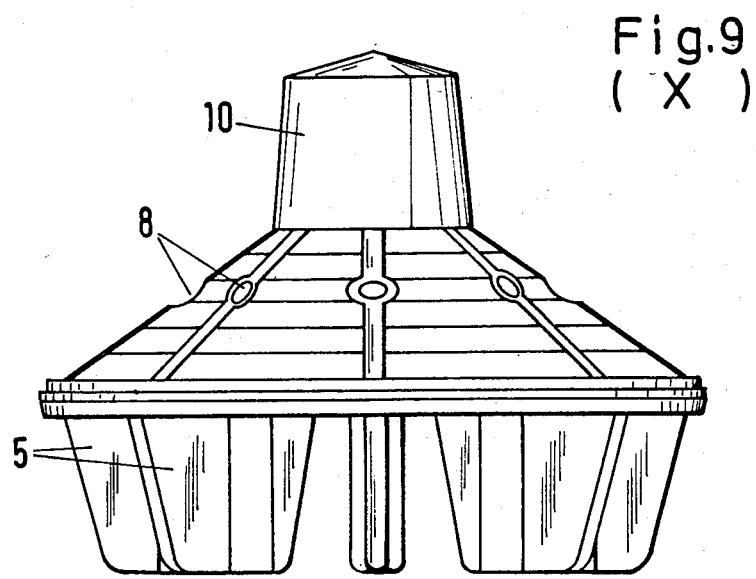

Further advantages, features and possible applications of this invention are clearly set out in the following description of preferred embodiments with reference to the related drawings. These show:

FIG. 1 the side view of a distributor cap,
FIG. 2 a top view of the distributor cap,
FIG. 3 a cross-section through the distributor cap along line E-F in FIG. 2,
FIG. 4 a further embodiment of the distributor cap in a side view,
FIG. 5 a top view of a distributor cap shown in FIG. 4,
FIG. 6 a section along line C-D in FIG. 5,
FIG. 7 the top view of a sealing screen for a distributor cap as shown in FIGS. 4-6,
FIG. 8 a section along line A-B in FIG. 7 and,
FIG. 9 a side view of the sealing screen according to FIG. 7.

The distributor cap shown in FIG. 3 consists essentially of the umbrella-shaped bottom section 15, the vanes 4 mounted beneath, and the hollow cone 9 acting as handle and vent. Furthermore at the transition zone between bottom section 15 and hollow cone 9 venting slot 13 can be seen.

FIG. 2 also shows the central venting duct 11 of the hollow cone 9. The vanes 4, which are partially shown with broken lines, can be seen as curved plates, which run in both radial and circumferential direction of distributor cap 3.

The section along line E-F in FIG. 2 is shown in FIG. 3 and makes it clear that the venting apertures 13 lying outside hollow cone 9 are intended to allow the air to escape from beneath the umbrella-shaped bottom section 15, when water penetrates at the sides along the vanes under distributor cap 3, to reach the filter cartridge via the apertures in sealing screen 2. Sealing screen 2 with its hollow cone 10 and vessel 1 beneath it are indicated by dash-dotted lines.

It is clearly evident from FIGS. 1 to 3 that a water jet arriving from above cannot impact directly on sealing screen 2 and the filter material beneath it, which would otherwise result in flow channels forming in the filtering material. The venting slots 13 are too small to allow significant quantities of water to flow through them. The water arriving on umbrella-shaped bottom section 15 flows down the sides and then penetrates into the intermediate spaces between vanes 4 under distributor cap 3 and thus reaches the screening apertures of the sealing screen 2. The shape and alignment of the vanes, which lie with their bottom edges against the too surface of the sealing screen 2 are such that the penetrating water is eddied around the bottom section of hollow cone 9, where it penetrates as on the surface between the vanes 4 gradually through the apertures of sealing screen 2. Both the sealing screen 2 and also the bottom section 15 of the distributor cap 3 have an essentially conical cross-section. Hereby in the centre of sealing screen 2 there is a further hollow cone 10 which can be firmly fitted into the underneath of venting duct 11 of hollow cone 9.

Venting duct 11 has the function of venting the sealing screen 2 and hollow cone 10, insofar as this is not completed via venting slots 13.

A further embodiment of a distributor cap 3 is shown in FIGS. 4 to 6. This embodiment is almost identical to the embodiment just described, but the vanes have additional pins 7 which can be fitted into apertures 8 of sealing screen 2 and as is shown in FIGS. 7 to 9.

Pins 7 are mounted at the ends of vanes 4 which are mostly inwards in radial direction, as can be seen in FIG. 5.

In the cross-section shown in FIG. 6 it can be seen how distributor cap 3 and sealing screen 2 are connected together. Sealing screen 2 with hollow cone 10 and vessel 1 are again shown in this FIG. by dash-dotted lines.

In the top view of FIG. 7 apertures 8 are clearly visible into which the pin 7 of distributor cap 3 are inserted. Sealing screen 2 is divided into 8 sectors 6 by separating ribs 5. So that the apertures 8 in the ribs 5 can be shown, the latter are correspondingly widened in the zone of apertures 8. As is shown in FIG. 9 and also in the cross-sectional drawing of FIG. 8, the ribs 5 consist essentially of radial plates, which apart from a small central zone extend in radial direction over practically the entire inner radius of vessel 1. Hereby the ribs 5 project into the filtering material located in vessel 1. The short hollow cone of sealing screen 2 has venting slots 14, through which the air in hollow space 12 and beneath can escape into venting duct 11 of hollow cone 9 of the distributor cap, when the filter tank in which the filter cartridge is placed is filled with water. The venting slots 14 are kept intentionally small in order to avoid any direct water jet impacting on the filtering material via the venting duct 11 of the open hollow cone 9 above.

In combination with the vanes 4 mounted directly on the surface of the screen the division of the sealing screen 2 into sectors 6 has the effect that the water filled into the filter tank is distributed very uniformly over the surface of the sealing screen 2 and passes very uniformly through the filtering material over the entire cross-section of the filter cartridge. The umbrellashaped bottom section 15 of the distributor cap 3 prevents a water jet from impacting directly onto the screen apertures and the filtering material beneath it and forming flow channels there. The absorption capacity of which for the substances to be filtered out of the water would be very quickly exhausted. Furthermore water which penetrates through the screen apertures of sealing screen 2 cannot collect at one point on the underneath of the screen and run down from there, since this is prevented by ribs 5 which project right into the filtering material.

Since the water or another liquid to be filtered flows through the filtering material over practically the complete internal cross-section of vessel 1, the quantity of the water flowing through per unit of time is relatively great inspite of a low flow velocity. The low flow speed at the same time guarantees a good filtration effect, since the filtering material can act for a corresponding time on the water. Furthermore there is optimum utilisation of the filtering material since during filter operation the water is always distributed uniformly over the cross-section of vessel 1, so no isolated areas or flow channels can become exhausted prematurely in filtering effect. The filtering material resp. the filter cartridge thus only need to be replaced when the capacity of the filtering material has been completely exhausted, without any risk of any deficiency in quality of the filtered water resp. this filtered liquid occurring already much earlier.

I claim:

1. A liquid distributor for a generally cylindrical filter cartridge (1) used to filter water for drinking purposes, the cartridge having a latitudinal axis and containing a quantity of filter material and also having an entrance screen (2) at one end thereof through which water enters the cartridge;
   the distributor comprising an essentially closed distributor cap (3) adapted for mounting over one end of the cartridge around the axis and covering the screen;
   said cap having a bottom section (15) including flow directing upper and lower surfaces which are symmetrical about the axis and are constructed and arranged to direct flow of liquid along said upper surfaces to the sides of the cartridge and between the screen and said lower surface so as to enter the filter cartridge through a space between the screen and lower surface of said cap; and
   means defining a venting duct (11) extending through said bottom section.

2. A liquid distributor as defined in claim 1, wherein said distributor cap includes on the underside of said bottom section a plurality of vanes in the form of plates (4) extending away from said cap and parallel to said axis.

3. A liquid distributor as defined in claim 2, wherein said plates are shaped to extend both radially and circumferentially of said distributor cap.

4. A liquid distributor as defined in claim 1, wherein a hollow vent cone (10) is fitted to the screen and said distributor cap is of conical shape and includes a central hollow cone (9) arranged to fit on the vent cone and point away from the filter cartridge, said hollow cone having a length which corresponds to at least the radius of the filter cartridge.

5. A liquid distributor for a filter cartridge (1) used in filtering water caused to flow through a generally cylindrical filter cartridge, the cartridge having at one end thereof a generally conical screen (2) with a centrally located vent cone (10) thereon;
   said distributor comprising an essentially closed circular distributor cap removably mounted on the screen in spaced concentric relation thereto,
   said cap having a flow directing bottom section (15) which is at least as large in diameter as the screen and is constructed and arranged to direct flow of liquid to the sides of the cartridge so as to enter the screen by flowing over the top of and then beneath said cap; and
   said distributor cap having means defining a venting duct (11) adapted for alignment with the vent cone(10) in the screen.

6. A liquid distributor as defined in claim 5, wherein said distributor cap includes on the underside of said flow directing surface a plurality of vanes in the form of plates (4) extending parallel to the axis of said cap.

7. A liquid distributor as defined in claim 6, wherein said plates are shaped to extend both radially and circumferentially of said distributor cap.

8. A liquid distributor according to claim 5, said distributor cap having on its underside at least one alignment pin arranged to cooperate with an aperture in the screen.

9. A liquid distributor claim 5, wherein said distributor cap is of conical shape and includes a central hollow cone arranged to point away from the filter cartridge, said cone having a length which corresponds to at least the radius of the filter cartridge.

10. The combination of claim 5, wherein said venting duct is formed in interfitting hollow cones extending from said cap and said screen.

11. A filter arrangement particularly adapted for the filtering of drinking water, comprising
    a generally cylindrical filter cartridge (1),
    a generally conical screen (2) fitted to one end of said filter cartridge and having a plurality of generally radially extending ribs (5) dividing said screen into sectors, and
    an essentially closed generally conical cap (3) removably mounted on said screen is spaced relation thereto on the opposite side from said filter cartridge, said cap having a smooth flow directing surface extending outward from its center so as to cause water to enter the sectors of said screen by flowing over and then beneath said cap.

12. A filter arrangement as defined in claim 11, wherein said cap includes on the underside of said flow directing surface a plurality of vanes in the form of plates (4) extending to said screen.

13. A filter arrangement as defined in claim 12, wherein said plates are shaped to extend both radially and circumferentially of said cap.

14. Apparatus as defined in claim 12, including means defining apertures (8) formed in said ribs, and pins (7) extending from said vanes and adapted to fit into said apertures to mount said cap on said screen.

15. Apparatus according to claim 11, said ribs of said screen having the shape of radially aligned plates which extend over the majority of an end of the filter cartridge and enter the cartridge up to a depth which at a maximum corresponds to the radius of the cartridge.

16. An assembly as defined in claim 11, wherein said cap is of conical shape and includes a central hollow cone (9) arranged to point away from the filter cartridge, and a hollow vent cone (10) formed on said screen and adapted to fit into said cone on said cap.

* * * * *

UNITED STATES PATENT AND TRADEMARK OFFICE
CERTIFICATE OF CORRECTION

PATENT NO. : 4,885,089
DATED : December 5, 1989
INVENTOR(S) : Heinz Hankammer

It is certified that error appears in the above-identified patent and that said Letters Patent is hereby corrected as shown below:

COLUMN 5, Line 53

"latitudinal should read -- longitudinal --

COLUMN 5, Line 65

"surfaces" should read -- surface --

COLUMN 6, Line 63

"is" should read -- in --

Signed and Sealed this

Fourth Day of December, 1990

Attest:

HARRY F. MANBECK, JR.

*Attesting Officer*  *Commissioner of Patents and Trademarks*